(12) United States Patent
Spatafora

(10) Patent No.: US 6,330,940 B1
(45) Date of Patent: Dec. 18, 2001

(54) CONVEYOR

(75) Inventor: Mario Spatafora, Bologna (IT)

(73) Assignee: G.D Societa' per Azioni, Bologna (IT)

( * ) Notice: Subject to any disclaimer, the term of this patent is extended or adjusted under 35 U.S.C. 154(b) by 0 days.

(21) Appl. No.: 09/473,842

(22) Filed: Dec. 28, 1999

(30) Foreign Application Priority Data

Jan. 11, 1999 (IT) .............................. BO99A0008

(51) Int. Cl.[7] .................................. B65G 15/26
(52) U.S. Cl. ............................ 198/594; 198/812
(58) Field of Search .................. 198/594, 812, 198/347.1

(56) References Cited

U.S. PATENT DOCUMENTS

| | | | |
|---|---|---|---|
| 2,740,301 | 4/1956 | Gartner | 74/394 |
| 2,932,376 | * 4/1960 | Millington | 198/594 X |
| 4,018,325 | * 4/1977 | Rejsa | 198/594 X |
| 5,611,418 | * 3/1997 | Helmstetter | 198/594 X |
| 5,960,927 | * 10/1999 | Bahr | 198/812 X |

FOREIGN PATENT DOCUMENTS 3320074   12/1984  (DE) .

OTHER PUBLICATIONS

Derwent English Abstract of DE 3320074 dated: Dec. 6, 1984.
Chironis N.P.: "Mechanisms, Linkages and Mechanical Controls." (1965) McGraw–Hill Book Company N.Y., N.Y. pp 78–79 (XP002114025).

* cited by examiner

Primary Examiner—James R. Bidwell
(74) Attorney, Agent, or Firm—Ladas & Parry

(57) ABSTRACT

A conveyor for transferring products has a belt looped about two pulleys; a first and a second conveying branch extending between the pulleys in a given direction; and an actuating device for activating the pulleys and defined by gear trains to impart to the pulleys a concordant reciprocating motion in the aforementioned direction according to a first law of motion; the belt being fed about the pulleys according to a second law of motion; and the first and second law of motion being so determined that the first branch is operated intermittently, and the second branch is operated continuously and uniformly.

23 Claims, 3 Drawing Sheets

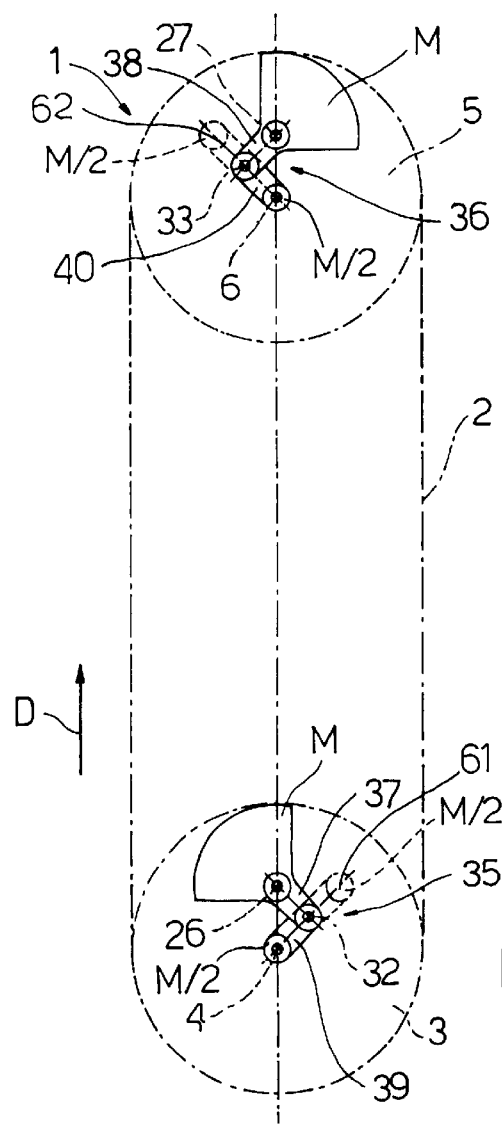
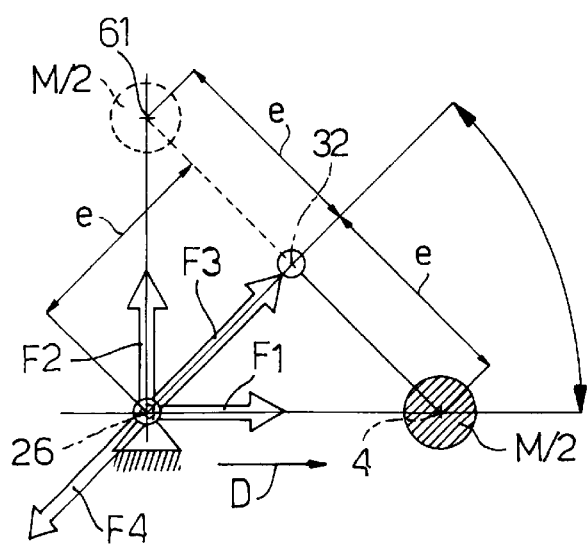

CONVEYOR

FIELD OF THE INVENTION

The present invention relates to a conveyor.

In particular, the present invention relates to a conveyor comprising a flexible member looped about at least two pulleys and having at least two conveying branches, a first of which may be operated, for example, continuously and uniformly, and a second of which may be operated, for example, intermittently.

BACKGROUND OF THE INVENTION

Conveyors of the above type are used on automatic machines, and in particular on product packing machines to transfer products between an intermittently-operated and a continuously-operated portion of the machine.

U.S. Pat. No, 4,735,032 relates to a conveyor of the above type, wherein a chain is looped about a number of pulleys, comprises equally spaced seats for receiving groups of cigarettes, and is powered by a drive pulley. The conveyor comprises one branch extending between two pulleys and operated intermittently, and a series of further branches extending between said two pulleys and operated continuously and uniformly. The two pulleys, which separate the intermittent branch from the continuous further branches, are fitted to respective slides engaging respective guides parallel to the intermittent branch, and are moved reciprocatingly in the same direction along the slides by means of a reciprocating connecting rod.

The laws of motion governing operation of the drive pulley and the connecting rod are so determined that said one branch is operated intermittently, i.e. has a succession of instants in which the branch is stopped, and the further branches are operated continuously and uniformly.

While theoretically ensuring correct operation of both the intermittent branch and the further continuous branches, the above conveyor, in actual use, has several drawbacks on account of the type of mechanism used to transmit reciprocating motion to the pulleys. That is, on the one hand, using slides and guides to guide the pulleys along respective straight courses generates considerable friction, thus resulting in wear and inaccuracy; and, on the other, seeing as most of the members for transmitting said reciprocating motion are themselves reciprocating members, the conveyor is subject to severe vibration.

Such drawbacks make the conveyor practically unusable.

SUMMARY OF THE INVENTION

It is an object of the present invention to provide a conveyor of the above type, designed to eliminate the aforementioned drawbacks.

According to the present invention, there is provided a conveyor for transferring products and comprising a flexible member looped about at least a first and a second pulley and in turn having at least a first and a second conveying branch, said first branch extending between said first and said second pulley in a given direction; and an actuating device for activating said first and said second pulley to impart to the first and the second pulley a concordant reciprocating motion in said direction according to a first law of motion; said flexible member being fed about said first and said second pulley according to a second law of motion; and said conveyor being characterized in that said actuating device comprises balance masses.

BRIEF DESCRIPTION OF THE DRAWINGS

A non-limiting embodiment of the present invention will be described by way of example with reference to the accompanying drawings, in which:

FIG. 3 shows a schematic view of the FIG. 1 conveyor;

FIG. 4 shows a detail of FIG. 3.

DETAILED DESCRIPTION OF THE INVENTION

Figure 1:
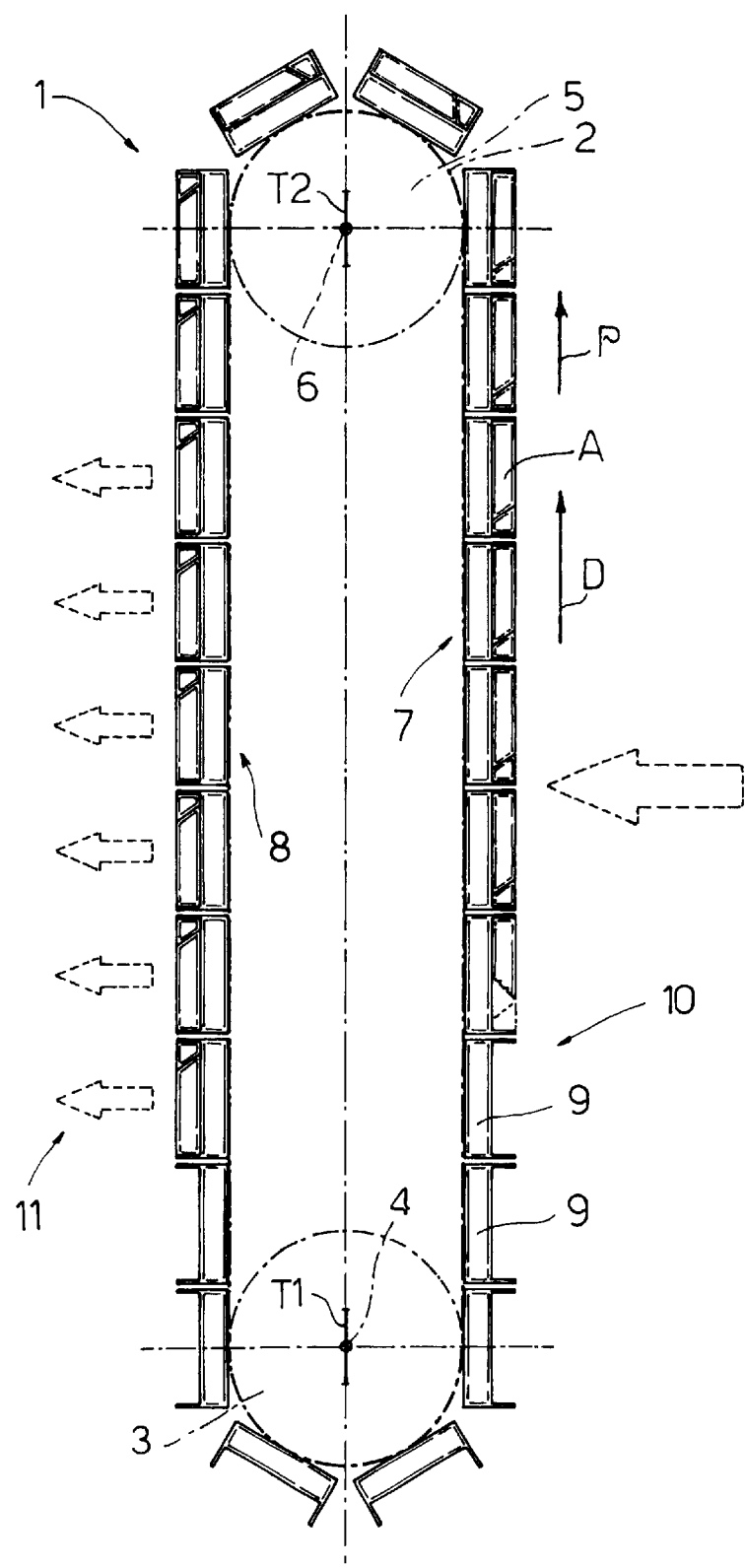
FIG. 1 shows a schematic front view of a preferred embodiment of the conveyor according to the present invention.

Number 1 in FIG. 1 indicates a conveyor comprising a belt 2, which is looped about a drive pulley 3 fitted to a shaft 4a and rotating about a respective axis 4, and about a driven pulley 5 fitted to a shaft 6a and rotating about a respective axis 6.

Conveyor 1 defines a path P, and comprises two straight conveying branches 7 and 8 extending between pulleys 3 and 5 in a vertical direction D. Belt 2 comprises a succession of equally spaced pockets 9 for transferring articles A between a loading station 10 for loading articles A and located along branch 7, and an unloading station 11 located along branch 8.

Axes 4 and 6 of respective pulleys 3 and 5 are movable, according to a given law of motion LM1, reciprocatingly in the same direction along respective straight courses T1 and T2 parallel to direction D, and drive pulley 3 is rotated about respective axis 4 according to a law of motion LM2.

Figure 2:
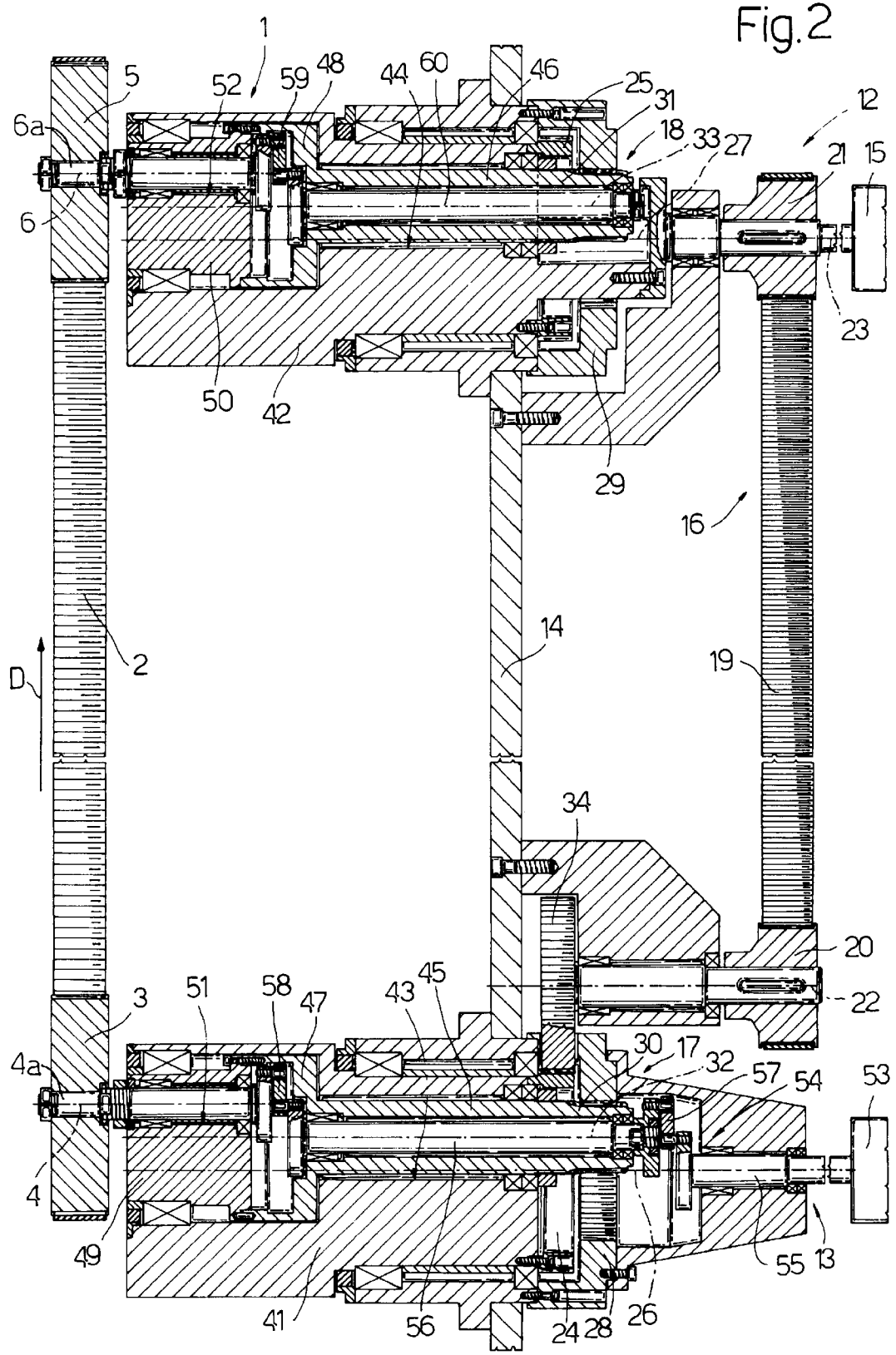
FIG. 2 shows a partially sectioned side view of the FIG. 1 conveyor.

With reference to FIG. 2, conveyor 1 comprises an actuating device 12 for transmitting to pulleys 3 and 5 the reciprocating motion according to law of motion LM1; an actuating device 13 for transmitting to pulley 3 the rotary movement about axis 4 according to law of motion Lm2; and a supporting frame 14.

As a consequence of the above movements of pulleys 3 and 5, branch 7 is preferably operated intermittently, and branch 8 continuously and uniformly.

Device 12 is defined by a number of gear trains, and comprises a motor 15 for powering a belt transmission 16; an epicyclic gear train 17 connected to pulley 3; and an epicyclic gear train 18 connected to pulley 5. Transmission 16 transmits motion from motor 15 to gear trains 17 and 18, and comprises a belt 19 looped about two pulleys 20 and 21 rotating about respective axes 22 and 23 parallel to axes 4 and 6 of pulleys 3 and 5. Epicyclic gear trains 17 and 18 comprise respective sun gears 24 and 25 rotating about respective axes 26 and 27; respective fixed ring gears 28 and 29; and respective planetary gears 30 and 31 rotating about respective axes 32 and 33.

Pulley 20 of transmission 16 is integral with a gear 34, which is coaxial with pulley 20 and meshes with sun gear 24 with a gear ratio of one; and pulley 21 is integral and coaxial with sun gear 25, which therefore rotates with the same law of motion as, but in the opposite direction to, sun gear 24.

Pulley 3 is connected to gear train 17 by means of a coupling between shaft 4a of pulley 3 and planetary gear 30, and wherein axis 4 is eccentric with respect to axis 32 of planetary gear 30, with an eccentricity value "e" equal to the distance between axis 26 of sun gear 24 and axis 32 of respective planetary gear 30. Similarly, pulley 5 is connected to gear train 18 by means of a coupling between shaft 6a of pulley 5 and planetary gear 31, and wherein axis 6 is eccentric with respect to axis 33 of planetary gear 31, with an eccentricity value "e" equal to the distance between axis 27 of sun gear 25 and axis 33 of respective planetary gear 31. In other words, and as shown more clearly in FIG. 3, each epicyclic gear train 17, 18, together with respective pulley 3, 5, forms a respective crank mechanism 35, 36, wherein the distance between the axis 26, 27 of respective sun gear 24, 25 and the axis 32, 33 of respective planetary gear 30, 31 represents a respective virtual crank 37, 38 of a length equal to eccentricity "e"; and the distance between the axis 32, 33 of planetary gear 30, 31 and respective axis 4, 6 of pulley 3, 5 represents a respective virtual connecting rod 39, 40 of a length equal to eccentricity "e".

Crank mechanisms 35 and 36 impart to axes 4 and 6 of respective pulleys 3 and 4 the reciprocating motion along respective courses T1 and T2, which assume a value equal to four times the value of eccentricity "e". Mechanically, axes 4 and 6 are maintained along straight courses T1 and T2 by sun gears 24 and 25, which, while effecting a given rotation, produce respective movements of cranks 37 and 38 and, at the same time, roll respective planetary gears 30 and 31 along respective fixed ring gears 28 and 29. Rotating about respective axes 32 and 33, planetary gears 30 and 31 rotate respective virtual connecting rods 39 and 40 about axes 32 and 33 by the same amount as and in the opposite direction to the rotation of respective virtual cranks 37 and 38.

With reference to FIG. 2, constructionwise, gear trains 17 and 18 are housed inside frame 14, are rotated by belt transmission 16 located on one side of frame 14, and transmit reciprocating motion to pulleys 3 and 5 located on the opposite side of frame 14 to belt transmission 16. Whereas fixed ring gears 28 and 29 are fitted rigidly to frame 14, sun gears 24 and 25 are connected rigidly to respective hollow drums 41 and 42 coaxial with respective sun gears 24 and 25 and fitted in rotary manner to frame 14. The cavities of drums 41 and 42 are eccentric with respect to axes 26 and 27 of respective sun gears 24 and 25, and comprise respective small portions facing belt transmission 16, and respective larger portions facing the respective pulleys. The cavities of drums 41 and 42 act as respective seats 43 and 44 for supporting respective planetary gears 30 and 31 in rotary manner.

Each planetary gear 30, 31 is in the form of a hollow drum, which comprises a relatively small-diameter portion 45, 46 facing belt transmission 16 and having outer teeth formed on the end facing respective fixed ring gear 28, 29 and which mesh with fixed ring gear 28, 29; and a larger-diameter portion 47, 48 facing respective pulley 3, 5 and connected integrally to a respective further hollow, coaxial drum 49, 50.

The cavities of drums 49 and 50 are substantially eccentric cylindrical holes, and act as respective seats 51 and 52 for respective shafts 4a and 6a of pulleys 3 and 5.

To transmit to pulley 3 the rotary movement about axis 4 according to law of motion LM2, actuating device 13 comprises a motor 53 connected to a constant-velocity universal joint 54, which comprises a shaft 55 fitted to frame 14 and connected to motor 53, and a shaft 56, which is fitted inside the cavity of the first portion 45 of planetary gear 30, is connected by a connecting rod 57 to shaft 55, and is connected by a connecting rod 58 to shaft 4a of pulley 3.

Shaft 6a of pulley 5 is connected by a connecting rod 59 to a shaft 60 housed inside the cavity of the first portion 46 of planetary gear 31, so that both the gear trains have the same rotary components, even though pulley 5 is driven by pulley 3 via belt 2.

In actual use, motor 15 drives device 12, which transmits to pulleys 3 and 5 the reciprocating motion along respective straight courses T1 and T2 according to law of motion LM1; and motor 53 drives device 13, which, via constant-velocity universal joint 54, rotates pulley 3 and belt 2 according to law of motion LM2.

During operation, conveyor 1 subjects to reciprocating motion in direction D a mass M, which substantially corresponds to the sum of the masses of pulleys 3 and 5 and the respective shafts 4a and 6a.

With reference to FIG. 3, mass M is considered as being applied equally, i.e. M/2, to axes 4 and 6 of pulleys 3 and 5; and the reciprocating motion of axes 4 and 6 generates forces of inertia F1 oriented in direction D and applied to axes 4 and 6, as shown more clearly in FIG. 4.

Drums 49 and 50 integral with respective planetary gears 30 and 31 are so sized that their own masses correspond to the masses M/2 applied at respective points 61 and 62, which are located at a distance equal to "e" from axes 32 and 33, and are diametrically opposite axes 4 and 6 with respect to axes 32 and 33.

Drums 41 and 42 integral with respective sun gears 24 and 25 are so sized as to be equal to respective eccentric masses M rotating about respective axes 26 and 27.

With reference to FIG. 4, mass M/2 of drum 49 generates a force of inertia F2 applied to axis 26 and perpendicular to force F1. The composition of forces parallelogram determines the resultant force F3, which is applied to axis 26, substantially rotates about axis 26, and is balanced by the applied mass M, which generates a rotary force F4 equal to and opposite force F3 and applied to axis 26. Such balancing is made possible by both sun gear 24 and the respective planetary gear rotating about respective axes 26 and 32 with the same law of motion LM1.

Epicyclic gear trains 17 and 18 rotate in opposite directions, so as to balance the torques generated by the variations in speed of law of motion LM1.

Conveyor 1 described affords various advantages. transmitting reciprocating motion to pulleys 3 and 5 by means of gearing 16, 17, 18, 34 provides, on the one hand, for precise transmission with no need for guides, and, on the other, for achieving a balanced conveyor as regards both moments of inertia and the forces of inertia in direction d.

What is claimed is:

1. A conveyor for transferring products (A) and comprising a flexible member (2) looped about at least a first and a second pulley (3, 5) and in turn having at least a first (7) and a second (8) conveying branch, said first branch (7) extending between said first and said second pulley (3, 5) in a given direction (D); and an actuating device (12) for activating said first and said second pulley (3, 5) to impart to the first and the second pulley (3, 5) a concordant reciprocating motion in said direction (D) according to a first law of motion (LM1); said flexible member (2) being fed about said first and said second pulley (3, 5), according to a second law of motion (LM2); wherein said second law of motion (LM1, LM2) being so determined that said first branch (7) is operated intermittently, and said second branch (8) is operated continuously and uniformly, and said actuating device (12) comprises balance masses (M, M/2) to balance inertia forces developed in said actuating device when producing the movements of said branches in accordance with said first and second laws.

2. A conveyor as claimed in claim 1, wherein said first and said second branch (7, 8) are vertical.

3. A conveyor as claimed in claim 1, wherein said actuating device comprises rotary members (16, 17, 18, 34).

4. A conveyor as claimed in claim 3, wherein said rotary members comprise gear trains (17, 18).

5. A conveyor as claimed in claim 4, wherein said gear trains (17, 18) comprise a first epicyclic gear train (17) associated with said first pulley (3), and a second epicyclic gear train (18) associated with the second pulley (5).

6. A conveyor as claimed in claim 5, wherein said first and said second epicyclic gear train (17, 18) respectively comprise a first and a second fixed ring gear (28, 29); a first and a second sun gear (24, 25) rotating about respective axes (26, 27); and a first and a second planetary gear (30, 31) rotating about respective axes (32, 33).

7. A conveyor as claimed in claim 6, wherein said first pulley (3) is fitted to a first shaft (4a) and rotates about a first axis (4), and said second pulley (5) is fitted to a second shaft (6a) and rotates about a second axis (6) parallel to said first axis (4); the axis (26) of the first sun gear (24) and the axis (32) of the first planetary gear (30) being parallel to the first axis (4); said first shaft (4a) being supported in rotary manner by said first planetary gear (30) and being eccentric with respect to axis (32) of the first planetary gear (30); the axis (27) of the second sun gear (25) and the axis (33) of the second planetary gear (31) being parallel to the second axis (6); and said second shaft (6a) being supported in rotary manner by said second planetary gear (31) and being eccentric with respect to the axis (33) of the second planetary gear (31).

8. A conveyor as claimed in claim 5, characterized in that said balance masses (M, M/2) are connected to said first and said second epicyclic gear train (17, 18).

9. A conveyor as claimed in claim 8, wherein the first and the second sun gear (24, 25) are connected to respective first eccentric balance masses (M); and the first and the second planetary gears (30, 31) are connected to respective second eccentric balance masses.

10. A conveyor as claimed in claim 9, wherein said first eccentric balance mass (M) equals twice said second eccentric balance mass (M/2).

11. A conveyor as claimed in claim 10, wherein said first eccentric balance mass (M) equals the mass of said first and said second pulley (3, 5).

12. A conveyor as claimed in claim 6, wherein the first and second sun gear (24, 25) rotate in opposite directions about the respective axes (26, 27).

13. A conveyor as claimed in claim 1, wherein said first pulley (3) is a drive pulley, and said second pulley (5) is a driven pulley.

14. A conveyor as claimed in claim 7, wherein said first shaft (4a) is connected to a constant-velocity universal joint (54) housed in said first gear train (17) to transmit said second law of motion (LM2) to said first pulley (3).

15. A conveyor as claimed in claim 14, wherein said second shaft (6a) is connected to a shaft (60) to balance a shaft (856) of said constant-velocity universal joint (54).

16. A conveyor for transferring products (A) and comprising a flexible member (2) looped about at least a first and a second pulley (3, 5) and in turn having at least a first (7) and a second (8) conveying branch, said first branch (7) extending between said first and said second pulley (3, 5) in a given direction (D); and an actuating device (12) for activating said first and said second pulley (3, 5) to impart to the first and the second pulley (3, 5) a concordant reciprocating motion in said direction (D) according to a first law of motion (LM1); said flexible member (2) being fed about said first and said second pulley (3, 5) according to a second law of motion (LM2); said actuating device (12) comprising balance masses (M, M/2); said second law of motion (LM1, LM2) being so determined that said first branch (7) is operated intermittently, and said second branch (8) is operated continuously and uniformly, said actuating device comprising rotary members (16, 17, 18, 34), which comprise gear trains (17, 18); wherein said gear trains (17, 18) comprise a first epicyclic gear train (17) associated with said first pulley (3), and a second epicyclic gear train (18) associated with the second pulley (5).

17. A conveyor as claimed in claim 16, wherein said first and said second epicyclic gear train (17, 18) respectively comprise a first and a second fixed ring gear (28, 29); a first and a second sun gear (24, 25) rotating about respective axes (26, 27); and a first and a second planetary gear (30, 31) rotating about respective axes (32, 33).

18. A conveyor as claimed in claim 17, wherein the first and second sun gear (24, 25) rotate in opposite directions about the respective axes (26, 27).

19. A conveyor as claimed in claim 17, wherein said first pulley (3) is fitted to a first shaft (4a) and rotates about a first axis (4), and said second pulley (5) is fitted to a second shaft (6a) and rotates about a second axis (6) parallel to said first axis (4); the axis (26) of the first sun gear (4) and the axis (32) of the first planetary gear (30) being parallel to the first axis (4); said first shaft (4a) being supported in rotary manner by said first planetary gear (30) and being eccentric with respect to the axis (32) of the first planetary gear (30); the axis (27) of the second sun gear (25) and the axis (33) of the second planetary gear (31) being parallel to the second axis (6); and said second shaft (6a) being supported in rotary manner by said second planetary gear (31) and being eccentric with respect to the axis (33) of the second planetary gear (31).

20. A conveyor as claimed in claim 16, wherein said balance masses (M, M/2) are connected to said first and said second epicyclic gear trains (17, 18).

21. A conveyor as claimed in claim 20, wherein the first and the second sun gears (24, 25) are connected to respective first eccentric balance masses (M); and the first and the second planetary gears (30, 31) are connected to respective second eccentric balance masses (M/2).

22. A conveyor as claimed in claim 21, wherein said first eccentric balance mass (M) equals twice said second eccentric balance mass (M/2).

23. A conveyor as claimed in claim 22, wherein said first eccentric balance mass (M) equals the mass of said first and said second pulley (3, 5).

* * * * *